United States Patent
Ramirez Corredores et al.

(10) Patent No.: US 8,647,398 B2
(45) Date of Patent: Feb. 11, 2014

(54) PRODUCTION OF RENEWABLE BIOFUELS

(75) Inventors: Maria Magdalena Ramirez Corredores, Houston, TX (US); Vicente Sanchez Iglesias, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 329 days.

(21) Appl. No.: 13/267,071

(22) Filed: Oct. 6, 2011

(65) Prior Publication Data

US 2012/0101318 A1 Apr. 26, 2012

Related U.S. Application Data

(60) Provisional application No. 61/405,990, filed on Oct. 22, 2010.

(51) Int. Cl.
*C07C 7/148* (2006.01)

(52) U.S. Cl.
USPC .......... 44/605; 585/240; 585/469; 585/638; 585/733; 585/818; 44/628

(58) Field of Classification Search
USPC ........... 585/240, 242, 469, 638, 733, 818
See application file for complete search history.

(56) References Cited

U.S. PATENT DOCUMENTS

| 5,877,380 A | 3/1999 | Conroy et al. |
| 2009/0301930 A1* | 12/2009 | Brandvold et al. ........ 208/17 |
| 2011/0245489 A1 | 10/2011 | Steele et al. |

* cited by examiner

*Primary Examiner* — Brian McCaig
(74) *Attorney, Agent, or Firm* — Hovey Williams LLP

(57) ABSTRACT

A process and system for separating and upgrading bio-oil into renewable fuels is provided. The process comprises separating bio-oil into a light fraction and heavy fraction based on their boiling points. The heavy fraction is then subjected to hydrotreatment, while the light fraction is not subjected to hydrotreatment. At least a portion of the un-hydrotreated light fraction and at least a portion of the hydrotreated heavy fraction are blended with petroleum-derived gasoline to thereby provide a renewable gasoline, and at least a portion of the hydrotreated heavy fraction is blended with petroleum-derived diesel to thereby provide a renewable diesel.

21 Claims, 1 Drawing Sheet

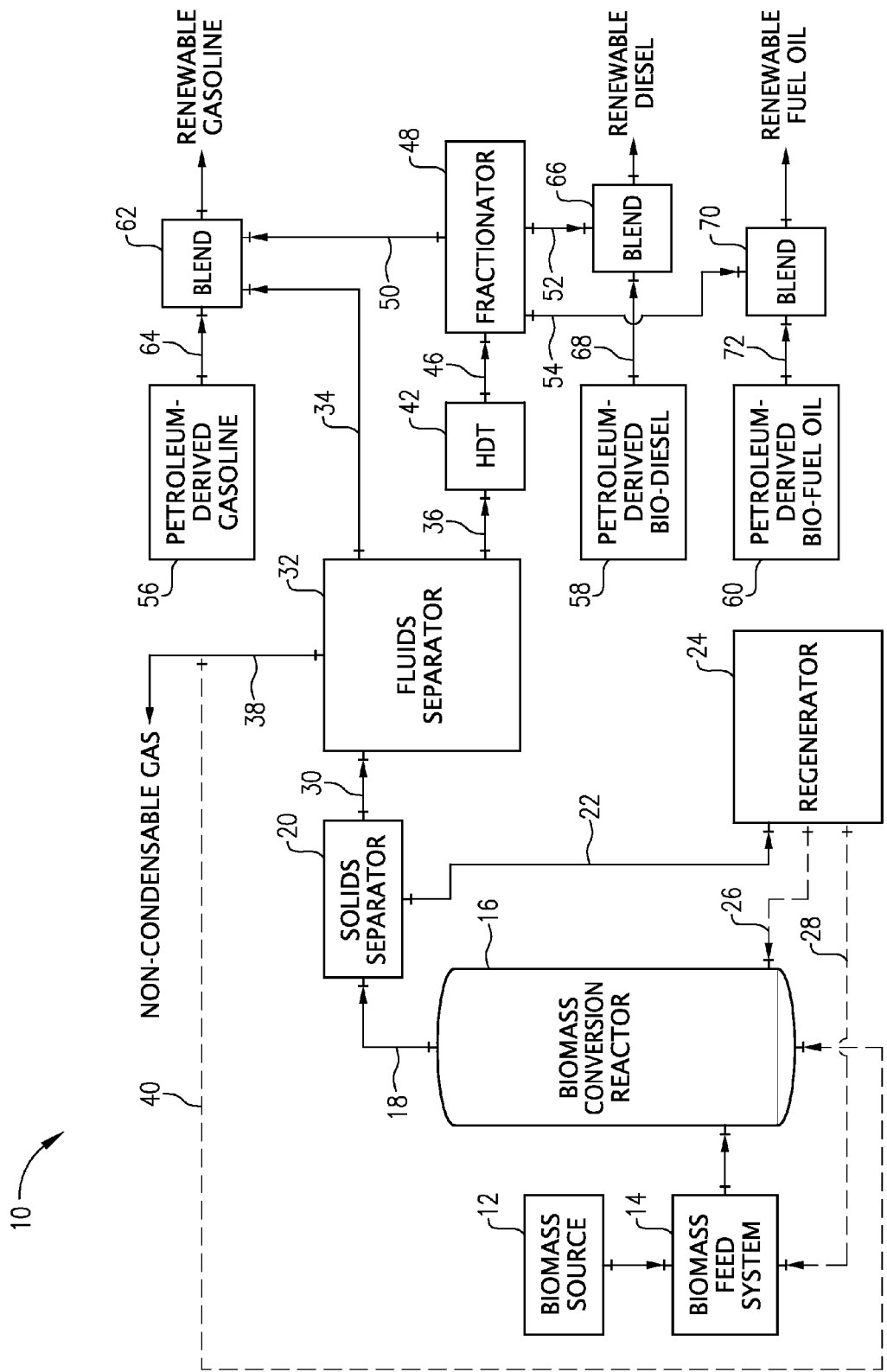

PRODUCTION OF RENEWABLE BIOFUELS

BACKGROUND

1. Field of the Invention

The present invention relates generally to the treatment of bio-oil. More specifically, the invention concerns processes and systems for producing renewable fuels or fuel additives from bio-oil.

2. Description of the Related Art

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite recent advancements in biomass conversion processes, many of the existing biomass conversion processes produce low-quality bio-oils containing high amounts of oxygen. These bio-oils require extensive secondary upgrading in order to be utilized as transportation fuels and/or as fuel additives due to the high amounts of oxygen present in the bio-oil. Furthermore, these transportation fuels and/or fuel additives derived from bio-oil vary in quality depending on the original oxygen content of the bio-oil.

Bio-oils can be subjected to various upgrading processes in order to process the bio-oil into renewable fuels and/or fuel additives. However, prior upgrading processes have been relatively inefficient and produce renewable fuels and/or fuel additives that have limited use in today's market. Furthermore, only limited amounts of these bio-oil derived transportation fuels and/or fuel additives may be combinable with petroleum-derived gasoline or diesel.

Accordingly, there is a need for an improved process and system for upgrading bio-oil into renewable fuels and/or fuel additives.

SUMMARY OF THE INVENTION

In one embodiment, the present invention is directed to a renewable fuel production process comprising: (a) providing a bio-oil having an oxygen content of less than 15 weight percent; (b) separating the bio-oil into at least a light fraction and a heavy fraction, wherein the mid-boiling point of the heavy fraction is at least 100° C. greater than the mid-boiling point of the light fraction; (c) hydrotreating at least a portion of the heavy fraction to thereby provide a hydrotreated product; and (d) combining at least a portion of the light fraction and at least a portion of the hydrotreated product with a petroleum-derived gasoline to thereby produce a renewable gasoline, wherein the renewable gasoline comprises the petroleum-derived gasoline in an amount of at least 60 weight percent, the light fraction in an amount of at least 0.1 weight percent, and the light hydrotreated product in an amount of at least 0.1 weight percent.

In another embodiment, the present invention is directed to a renewable fuel production process comprising: (a) thermochemically converting biomass in the presence of a catalyst to thereby produce bio-oil; (b) separating the bio-oil into a bio-gasoline fraction and a bio-distillate fraction by heated distillation, wherein at least 75 weight percent of the bio-gasoline fraction has a boiling point below 205° C., wherein at least 75 weight percent of the bio-distillate fraction has a boiling point above 205° C., wherein the mid-boiling point of the bio-distillate fraction is at least 100° C. greater than the mid-boiling point of the bio-gasoline fraction; (c) hydrotreating and fractionating at least a portion of the bio-distillate fraction to thereby provide separate streams of a hydrotreated bio-gasoline, a hydrotreated bio-diesel, and a hydrotreated bio-fuel oil, wherein at least 75 weight percent of the hydrotreated bio-gasoline has a boiling point less than 205° C., wherein at least 75 weight percent of the hydrotreated bio-diesel has a boiling point between 205° C. to 325° C., wherein at least 75 weight percent of the hydrotreated bio-fuel oil has a boiling point above 325° C.; and (e) combining at least a portion of the bio-gasoline fraction and at least a portion of the hydrotreated bio-gasoline with a petroleum-derived gasoline to thereby produce a renewable gasoline.

In a further embodiment, the present invention is directed to a bio-oil production system comprising: (a) a biomass feedstock source for providing solid particulate biomass; (b) a conversion reactor for thermally converting the solid particulate biomass into a bio-oil; (c) a separator for separating the bio-oil into at least a bio-gasoline fraction and a bio-distillate fraction; (d) a hydrotreater for hydrotreating the bio-distillate fraction to thereby produce a hydrotreated product; (e) a fractionator for fractionating the hydrotreated product into at least a hydrotreated bio-gasoline and a hydrotreated bio-diesel; (f) a petroleum-derived gasoline source for providing a petroleum-derived gasoline; (g) a gasoline blending system for combining at least a portion of the bio-gasoline fraction and at least a portion of the hydrotreated gasoline with the petroleum-derived gasoline; (h) a petroleum-derived diesel source for providing a petroleum-derived diesel; and (i) a diesel blending system for combining at least a portion of the hydrotreated bio-diesel with the petroleum-derived diesel.

BRIEF DESCRIPTION OF THE FIGURES

FIG. 1 is a schematic diagram of a biomass conversion system according to one embodiment of the present invention.

DETAILED DESCRIPTION

FIG. 1 depicts a biomass conversion system 10 that includes a means for separating and/or upgrading bio-oil into renewable fuels and/or fuel additives. It should be understood that the biomass conversion system shown in FIG. 1 is just one example of a system within which the present invention can be embodied. The present invention may find application in a wide variety of other systems where it is desirable to efficiently and effectively separate and/or upgrade bio-oil into renewable fuels and/or fuel additives. The exemplary biomass conversion system illustrated in FIG. 1 will now be described in detail.

The biomass conversion system 10 of FIG. 1 includes a biomass source 12 for supplying a biomass feedstock to be converted to bio-oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst may be fresh and/or regenerated catalyst. The catalyst can, for example, comprise a solid acid, such as a zeolite. Examples of suitable zeolites include ZSM-5, mordenite, beta, ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 16, they are not considered catalysts.

The biomass feed system 14 introduces the biomass feedstock into a biomass conversion reactor 16. In the biomass conversion reactor 16, biomass is subjected to a conversion reaction that produces bio-oil. The biomass conversion reactor 16 can facilitate different chemical conversion reactions such as fast pyrolysis, slow pyrolysis, liquefaction, gasification, or enzymatic conversion. The biomass conversion reactor 16 can be, for example, a fluidized bed reactor, a cyclone reactor, an ablative reactor, or a riser reactor.

In one embodiment, the biomass conversion reactor 16 can be a riser reactor and the conversion reaction can be fast pyrolysis. More specifically, fast pyrolysis may include catalytic cracking. As used herein, "pyrolysis" refers to the chemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, noncondensable gases recycled from the biomass conversion process, and/or any combination thereof.

Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis may occur at temperatures between 200 and 1,000° C., between 250 and 800° C., or between 300 and 600° C.

Referring again to FIG. 1, the conversion effluent 18 exiting the biomass conversion reactor 16 generally comprises gas, vapors, and solids. As used herein, the vapors produced during the conversion reaction may interchangeably be referred to as "bio-oil," which is the common name for the vapors when condensed into their liquid state. In one embodiment of the present invention, the conversion reaction carried out in the biomass conversion reactor 16 produces a highly stable bio-oil. Such stable bio-oil can have an oxygen content that is less than 15, 12, 10, or 8 percent by weight of the bio-oil.

When fast pyrolysis is carried out in the biomass conversion reactor 16, the conversion effluent 18 generally comprises solid particles of char, ash, and/or spent catalyst. The conversion effluent 18 can be introduced into a solids separator 20. The solids separator 20 can be any conventional device capable of separating solids from gas and vapors such as, for example, a cyclone separator or a gas filter. The solids separator 20 removes a substantial portion of the solids (e.g., spent catalysts, char, and/or heat carrier solids) from the conversion effluent 18. The solid particles 22 recovered in the solids separator 20 can be introduced into a regenerator 24 for regeneration, typically by combustion. After regeneration, at least a portion of the hot regenerated solids can be introduced directly into the biomass conversion reactor 16 via line 26. Alternatively or additionally, the hot regenerated solids can be directed via line 28 to the biomass feed system 14 for combination with the biomass feedstock prior to introduction into the biomass conversion reactor 16.

The solids-free fluid stream 30 exiting the solids separator 20 can then be introduced into a fluids separator 32. In one embodiment, it is preferred that the bio-oil entering the fluids separator 32 has not previously been subjected to a deoxygenation process such as, for example, hydrotreating. The fluids separator 32 can be any system capable of separating the solids-free fluid stream 30 into at least a light fraction 34 and a heavy fraction 36. Suitable systems to be used as the fluids separator 32 include, for example, systems for affecting separation by heated distillation, extraction, membrane separation, partial condensation, and/or non-heated fractionation. When the bio-oil entering the fluids separator 32 is highly stable, it may be preferred to employ heated distillation to affect separation, where such heated distillation raises the temperature of the solids-free fluid stream 30 above 100° C. As shown in FIG. 1, non-condensable gases 38 may be removed from the fluids separator 32 and, optionally, recycled via line 40 to the biomass conversion reactor 16 for use as a lift gas.

The light fraction 34 exiting fluids separator 32 can have a boiling range comparable to petroleum-derived gasoline. Thus, the light fraction 34 may also be referred to as a bio-gasoline fraction. The heavy fraction 36 exiting fluids separator 32 can have a boiling range comparable to petroleum-derived distillates. Thus, the heavy fraction 36 may also be referred to as a bio-distillate fraction.

The boiling range of the light fraction 34 can be such that at least 75, 85, or 95 weight percent of the light fraction 34 boils at a temperature of less than 205° C. The boiling range of the heavy fraction 36 can be such that at least 75, 85, or 95 weight percent of the heavy fraction 36 boils at a temperature greater than 205° C.

The light fraction 34 can have a mid-boiling point in the range of 50 to 200° C., 70 to 180° C., or 80 to 160° C. As used herein, "mid-boiling point" refers to the median boiling point temperature of the relevant fraction, where 50 weight percent of the fraction boils above the mid-boiling point and 50 weight percent boils below the mid-boiling point. The heavy fraction 36 can have a mid-boiling point in the range of 210 to 700° C., 220 to 410° C., or 230 to 400° C. The heavy fraction 36 can have a mid-boiling point that is at least 100° C., 125° C., or 150° C. greater than the mid-boiling point of the light fraction 34.

In one embodiment, at least 5, 10, or 20 weight percent of the bio-oil entering the fluids separator 32 is separated into the light fraction 34. In another embodiment at least 10, 20, or 30 weight percent and/or no more than 90, 85, or 80 weight percent of the bio-oil 30 entering the fluids separator 32 is separated into the heavy fraction 36. Additionally, both the light fraction 34 and the heavy fraction 36 can have an oxygen content that is less than 12, 10, 8, or 6 weight percent.

Referring again to FIG. 1, the heavy fraction 36 removed from the fluids separator 32 can be introduced into a hydrotreater 42. The hydrotreater 42 can be any conventional hydrotreater commonly known and used in the art. The hydrotreater 42 is operable to lower the oxygen content of heavy fraction 36 to thereby produce a hydrotreated product 46 having an oxygen content of less than 10, 5, or 1 weight percent. The hydrotreated product 46 can then be introduced into a fractionator 48 for separation into a hydrotreated bio-gasoline 50, a hydrotreated bio-diesel 52, and a hydrotreated bio-fuel oil 54. Although FIG. 1 shows the fractionator 48 as being located downstream of the hydrotreater 42, it is also possible for the fractionator 48 to be located upstream of the hydrotreater 42 so that the hydrotreater receives and separately hydrotreats the individual fractions.

In one embodiment, at least 2, 5, 20, 40, or 50 weight percent of the heavy fraction 36 is hydrotreated and fractionated into the hydrotreated bio-gasoline 50; at least 5, 10, or 20 weight percent of the heavy fraction 36 is hydrotreated and fractionated into the hydrotreated bio-diesel 52; and at least 5, 10, or 20 weight percent of the heavy fraction 36 is hydrotreated and fractionated into the hydrotreated bio-fuel oil 54.

Each of the hydrotreated fractions 50, 52, and/or 54 can have an oxygen content of less than 10, 5, or 1, weight percent. Additionally, the boiling range of the hydrotreated bio-gasoline 50 can be such that at least 75, 85, or 95 weight percent of the hydrotreated bio-gasoline 50 boils at a temperature of less than 205° C.; the boiling range of the hydrotreated bio-diesel 52 can be such that at least 75, 85, or 95 weight percent of the hydrotreated bio-diesel 52 boils at a temperature in the range of 205 to 325° C.; and the boiling range of the hydrotreated bio-fuel oil 54 can be such that at least 75, 85, or 95 weight percent of the hydrotreated bio-fuel oil 54 boils at a temperature greater than 325° C.

As illustrated in FIG. 1, biomass production system 10 can be located near or connected by a transportation system with a petroleum-derived gasoline source 56, a petroleum-derived diesel source 58, and/or a petroleum-derived fuel oil source 60. One or more of the sources 56, 58, and 60 of petroleum-derived fuels can be, for example, a petroleum refinery, a petroleum fuel storage facility, and/or a petroleum fuel transportation system.

A gasoline blending system 62 can be used to combine a petroleum-derived gasoline 64 from gasoline source 56 with at least a portion of the light fraction 34 and the hydrotreated bio-gasoline 50 to thereby produce a renewable gasoline. The renewable gasoline can comprise the petroleum-derived gasoline 64 in an amount of at least 60, 70, 80, or 90 weight percent and/or at most 99.5, 99, 98, or 96 weight percent; the light fraction 34 in an amount of at least 0.1, 0.2, 0.5, or 1 weight percent and/or at most 40, 20, 10, or 5 weight percent; and/or the hydrotreated bio-gasoline in an amount of at least 0.1, 0.2, 0.5, or 1 weight percent and/or at most 40, 20, 10, or 5 weight percent.

A diesel blending system 66 can be used to combine a petroleum-derived diesel 68 from diesel source 58 with at least a portion of the hydrotreated bio-diesel 52 to thereby produce a renewable diesel. The renewable diesel can comprise the petroleum-derived diesel 68 in an amount of at least 60, 70, 80, or 90 weight percent and/or at most 99.5, 99, 98, or 96 weight percent and the hydrotreated bio-diesel 52 in an amount of at least 0.1, 0.2, 0.5, or 1 weight percent and/or at most 40, 20, 10, or 5 weight percent.

A fuel oil blending system 70 can be used to combine a petroleum-derived fuel oil 72 from fuel oil source 60 with at least a portion of the hydrotreated bio-fuel oil 54 to thereby produce a renewable fuel oil. The renewable fuel oil can comprise the petroleum-derived fuel oil 72 in an amount of at least 60, 70, 80, or 90 weight percent and/or at most 99.5, 99, 98, or 96 weight percent and the hydrotreated bio-fuel oil 54 in an amount of at least 0.1, 0.2, 0.5, or 1 weight percent and/or at most 40, 20, 10, or 5 weight percent.

EXAMPLES

Example 1

A bio-oil, derived from the thermo-catalytic conversion of biomass and containing about 13 wt % oxygen, was separated into a light fraction and a heavy fraction by molecular distillation. The maximum temperature for the separation was 205° C. The mid-boiling point of the heavy fraction was 248.4° C., which is over 100° C. higher than the mid-boiling point of the light fraction, which was 143.8° C. The boiling profiles for each of the streams were determined by simulated distillation. The quantities of light and heavy fractions obtained were 12 wt %, and 87 wt %, respectively, based on the total weight of the bio-oil (bio-oil and water of ~4 wt % was also recovered and decanted from the light fraction). A portion of the heavy fraction was then hydrotreated under the following conditions, 300-375° C., 800-2000 psi and LHSV=0.5-3 $h^{-1}$, over a typical Nickel and Molybdenum containing commercial hydrotreating catalyst. The hydrotreated heavy fraction was then separated into a renewable-gasoline fraction, a renewable-diesel fraction, and a renewable-fuel oil fraction. Results of the separations and hydrotreatment are shown in Tables 1 and 2 below.

TABLE 1

|  | Bio-oil | Light Fraction | Heavy Fraction | Hydrotreated Heavy Fraction |
| --- | --- | --- | --- | --- |
| Mid-boiling point | 224.7 | 157.8 | 262.8 | 206 |
| Boiling Point Range | 28.8-523.8 | 28-200 | 40-525 | 40-550 |
| Oxygen Content | 11 | 8.5 | 12.3 | 0.08 |
| TAN | 5 | 4.4 | 2.2 | 0.09 |
| Wt % boiling below 205 C. | 34 | 100 | 36 | 52 |
| Wt % boiling between 205 C. and 325 C. | 40 | 0 | 37 | 36 |

TABLE 1-continued

|  | Bio-oil | Light Fraction | Heavy Fraction | Hydrotreated Heavy Fraction |
|---|---|---|---|---|
| Wt % boiling above 325 C. | 24 | 0 | 27 | 12 |

The light fraction exhibited a boiling profile in a range similar to commercially available petroleum derived gasoline. The heavy fraction had reduced TAN, as compared to the bio-oil, and included components boiling in the gasoline, diesel and fuel oil range. The hydrotreated heavy fraction had nearly undetectable oxygen and TAN.

TABLE 2

|  | Renewable-gasoline Fraction of the Hydrotreated Heavy Fraction | Renewable-diesel Fraction of the Hydrotreated Heavy Fraction | Renewable-fuel oil Fraction of the Hydrotreated Heavy Fraction |
|---|---|---|---|
| Mid-boiling point | 130 | 275 | 400 |
| Boiling Point Range | 30–215 | 210–370 | 360–510 |
| Oxygen Content | <0.05 | <0.05 | 0.09 |
| TAN | ND | ND | ND |
| Wt % boiling below 205 C. | 97 | 2 | 0 |
| Wt % boiling between 205 C. and 325 C. | 3 | 94 | 12 |
| Wt % boiling above 325 C. | 0 | 4 | 88 |

The hydrotreated heavy fraction was separable into separate renewable-gasoline, renewable-diesel and renewable-fuel oil fractions. The renewable gasoline fraction exhibited a boiling profile in a range equivalent to commercially available petroleum derived gasoline, the renewable-diesel fraction exhibited a boiling profile similar to that of a commercially available petroleum derived diesel, and the renewable-fuel oil fraction exhibited a boiling profile similar to that of commercially available petroleum derived fuel oil. All of the renewable fractions had either undetectable or extremely low levels of oxygen and TAN.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

It is the inventors' intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A process for producing a renewable fuel, said process comprising:
   (a) providing a bio-oil having an oxygen content of less than 15 weight percent;
   (b) separating said bio-oil into at least a light fraction and a heavy fraction, wherein the mid-boiling point of said heavy fraction is at least 100° C. greater than the mid-boiling point of said light fraction;
   (c) hydrotreating at least a portion of said heavy fraction to thereby provide a hydrotreated product; and
   (d) combining at least a portion of said light fraction and at least a portion of said hydrotreated product with a petroleum-derived gasoline to thereby produce a renewable gasoline, wherein said renewable gasoline comprises said petroleum-derived gasoline in an amount of at least 60 weight percent, said light fraction in an amount of at least 0.1 weight percent, and said hydrotreated product in an amount of at least 0.1 weight percent.

2. The process of claim 1, wherein said bio-oil has not previously been subjected to hydrotreatment.

3. The process of claim 1, wherein the oxygen content of said bio-oil is less than 10 weight percent.

4. The process of claim 1, wherein said separating of step (b) is carried out by distillation.

5. The process of claim 1, wherein said separating of step (b) is carried out by extraction, membrane separation, partial condensation, and/or non-heated fractionation.

6. The process of claim 1, wherein at least 75 weight percent of said light fraction boils at a temperature below 205° C., wherein at least 75 weight percent of said heavy fraction boils at a temperature above 205° C.

7. The process of claim 1, wherein at least 5 weight percent of said bio-oil subjected to said separating of step (b) is separated into said light fraction, wherein at least 10 weight percent of said bio-oil subjected to said separating of step (b) is separated into said heavy fraction.

8. The process of claim 1, wherein said renewable gasoline comprises said petroleum-derived gasoline in an amount of at least 70 weight percent and at most 99 weight percent; wherein said renewable gasoline comprises said light fraction in an amount of at least 0.1 weight percent and at most 20 weight percent, wherein said renewable gasoline comprises said hydrotreated product in an amount of at least 0.1 weight percent and at most 50 weight percent.

9. The process of claim 1, further comprising recovering a hydrotreated bio-gasoline fraction from said hydrotreated product, wherein at least 75 weight percent of the hydrotreated bio-gasoline fraction has a boiling point less than 205° C., wherein said hydrotreated bio-gasoline fraction is said portion of said hydrotreated product that is combined with said petroleum-derived gasoline in step (d).

10. The process of claim 1, further comprising separating said hydrotreated product into a hydrotreated bio-gasoline fraction, a hydrotreated bio-diesel fraction, and a hydrotreated bio-fuel oil fraction, wherein at least 75 weight percent of the hydrotreated bio-gasoline fraction has a boiling point less than 205° C., wherein at least 75 weight percent of the hydrotreated bio-diesel fraction has a boiling point between 205° C. to 325° C., wherein at least 75 weight percent of the hydrotreated bio-fuel oil fraction has a boiling point above 325° C.

11. The process of claim 10, wherein at least 2 weight percent of said hydrotreated product is separated into said hydrotreated bio-gasoline fraction, wherein at least 5 weight percent of said hydrotreated product is separated into said hydrotreated bio-diesel product, wherein at least 5 weight percent of said hydrotreated product is separated into said hydrotreated bio-fuel oil fraction.

12. The process of claim 10, wherein said hydrotreated bio-gasoline fraction is said portion of said hydrotreated product that is combined with said petroleum-derived gasoline in step (d), further comprising blending at least a portion of said hydrotreated diesel fraction with a petroleum-derived diesel to thereby produce a renewable diesel, further comprising blending at least a portion of said hydrotreated bio-fuel oil fraction with a petroleum-derived fuel oil to thereby produce a renewable fuel oil.

13. The process of claim 1, wherein said providing of step (a) includes thermochemically converting biomass in the presence of a catalyst, wherein said bio-oil is not subjected to deoxygenation between said thermochemically converting and said separating of step (b).

14. The process of claim 13, wherein said thermochemically converting comprises fast pyrolysis carried out in a riser reactor.

15. A process for producing a renewable fuel, said process comprising:
(a) thermochemically converting biomass in the presence of a catalyst to thereby produce bio-oil;
(b) separating said bio-oil into a bio-gasoline fraction and a bio-distillate fraction by heated distillation, wherein at least 75 weight percent of the bio-gasoline fraction has a boiling point below 205° C., wherein at least 75 weight percent of the bio-distillate fraction has a boiling point above 205° C., wherein the mid-boiling point of said bio-distillate fraction is at least 100° C. greater than the mid-boiling point of said bio-gasoline fraction;
(c) hydrotreating and fractionating at least a portion of said bio-distillate fraction to thereby provide separate streams of a hydrotreated bio-gasoline, a hydrotreated bio-diesel, and a hydrotreated bio-fuel oil, wherein at least 75 weight percent of said hydrotreated bio-gasoline has a boiling point less than 205° C., wherein at least 75 weight percent of said hydrotreated bio-diesel has a boiling point between 205° C. to 325° C., wherein at least 75 weight percent of the hydrotreated bio-fuel oil has a boiling point above 325° C.; and
(e) combining at least a portion of said bio-gasoline fraction and at least a portion of said hydrotreated bio-gasoline with a petroleum-derived gasoline to thereby produce a renewable gasoline.

16. The process of claim 15, wherein the oxygen content of said bio-oil is less than 15 weight percent, wherein said bio-oil is not subjected to hydrotreatment prior to said separating of step (b).

17. The process of claim 15, wherein said hydrotreating of step (c) is carried out prior to said fractionating of step (c).

18. The process of claim 15, wherein at least 20 weight percent of said bio-oil subjected to said separating of step (b) is separated into said bio-gasoline fraction, wherein at least 10 weight percent of said bio-oil subjected to said separating of step (b) is separated into said bio-distillate fraction.

19. The process of claim 15, wherein said renewable gasoline comprises said petroleum-derived gasoline in an amount of at least 60 weight percent and at most 99.5 weight percent, wherein said renewable gasoline comprises a blend component selected from the group consisting of said bio-gasoline, said hydrotreated bio-gasoline fraction, and combinations thereof, in an amount of at least 0.1 weight percent and at most 40 weight percent, wherein said renewable gasoline comprises said hydrotreated bio-gasoline in an amount of at least 0.1 weight percent and at most 40 weight percent.

20. The process of claim 15, further comprising blending at least a portion of said hydrotreated bio-diesel with a petroleum-derived diesel composition to thereby produce a renewable diesel.

21. The process of claim 15, wherein said thermochemically converting of step (a) converts lignocellulosic biomass by fast pyrolysis in a riser reactor.

* * * * *